United States Patent Office 3,162,620
Patented Dec. 22, 1964

3,162,620
ETHYLENE POLYMERS PREPARED IN THE FORM OF A COHERENT FILM AT A QUIESCENT LIQUID CATALYST SURFACE
Edward K. Gladding, New Castle, Del., assignor to E. I. du Pont de Nemours and Company, Wilmington, Del., a corporation of Delaware
No Drawing. Filed May 4, 1961, Ser. No. 107,655
12 Claims. (Cl. 260—80.5)

This invention relates to a novel polymerization process and more particularly to a process for polymerizing ethylene and mixtures of ethylene with other copolymerizable monomers in the form of a coherent film at a quiescent liquid catalyst surface.

Polymers and copolymers of copolymerizable monomers, such as ethylene and propylene, are made today by solutions and slurry processes. Solution processes suffer from the disadvantage that the viscosity tends to be inconveniently high durirng the reaction unless the solids content is kept quite low. A high viscosity leads to excessive power requirements for agitation and makes removal of the large heat of polymerization very difficult, thereby adversely influencing the economic potential of these polymers. In addition, the recovery of the polymer from the solution requires additional steps. The solvent may be removed by evaporative distillation or drum drying. The solution may be mixed with a non-solvent for the polymer to precipitate the polymer, additional steps then being needed to recover the solvent for the polymerization process itself.

Slurry processes, that is processes in which the polymer product separates from the reaction medium in a finely divided solid form during the reaction, permit higher yields of product per unit volume of reactor capacity than do the solution processes. However, the build-up of the slurry during the reaction creates problems by obstructing the flow lines of the reaction system. It would, therefore, be desirable to have an alternative process offering the possibility of considerably reduced solvent usage and less expensive product isolation.

It is an object of the present invention to provide a new polymerization process for preparing ethylene homopolymers and copolymers of ethylene with other copolymerizable materials. A further object is to provide a process for preparing these polymeric products in the presence of coordination catalyst systems whereby solvent usage is reduced and product isolation costs are decreased. A still further object is to provide a process for preparing these polymeric products wherein the polymer is obtained in the form of a coherent film at a quiescent liquid catalyst surface. Other objects will appear hereinafter.

These and other objects of this invention are accomplished by a process which comprises preparing normally solid polyethylene or a normally solid copolymer of ethylene with at least one other copolymerizable monomer in the presence of a coordination catalyst in a liquid reaction medium in which said polyethylene and ethylene copolymers are insoluble, with the proviso that the said polyethylene or ethylene copolymer is formed at a quiescent liquid surface of said liquid reaction medium having said coordination catalyst dispersed throughout. The polymeric product, which is either polyethylene or a copolymer of ethylene with at least one other copolymerizable material, is formed at the quiescent liquid catalyst surface in the form of a coherent film and this film may be readily removed from this quiescent surface.

The essence of the present invention resides in forming the polymeric products in the form of a coherent film at a quiescent liquid catalyst surface. The term "polymeric product" as used throughout the specification and claims is intended to include the normally solid homopolymers of ethylene as well as the normally solid copolymers of ethylene and at least one other copolymerizable material. In carrying out this process, a liquid reaction medium is used and this medium has the coordination catalyst dispersed substantially uniformly throughout. It is necessary that the polymeric product obtained by this polymerization process be substantially insoluble in the liquid medium. In order that the coordination catalyst be substantially uniformly dispersed throughout the liquid medium, it is preferred that the coordination catalyst be soluble in the liquid medium; however, this is not a necessary requirement since various liquid media are suitable wherein the coordination catalyst is not soluble but may be dispersed well enough so that no Tyndall effect is observed. The solubility behavior of any particular polymeric product in a particular liquid medium will depend in part upon the temperature at which the polymerization is carried out. At some temperatures the polymeric product may be completely insoluble while at other temperatures it may be partially or completely soluble. Temperatures at which the polymeric product is insoluble can be readily determined for any particular polymeric product with any particular liquid medium by those skilled in the art. For purposes of the present invention, the preferred liquid media are methylene chloride, ethyl chloride and 1,2-dichloroethane. A quiescent surface of this liquid catalyst reaction medium is formed and the polymerizable monomer or monomers are then brought into contact with this surface so as to form a coherent film of polymeric product. This product may then be readily removed by mechanical means from the liquid surface.

The polymeric products which may be obtained by the process of the present invention include the normally solid homopolymers of ethylene as well as the normally solid copolymers of ethylene with at least one other copolymerizable material. Representative copolymers are those obtained by copolymerizing ethylene with an alpha monoolefin having the structure R—CH=CH$_2$ wherein R is an alkyl radical of not more than about eight carbon atoms or by copolymerizing ethylene, an alpha monolefin as defined above and a non-conjugated hydrocarbon diene. Representative dienes include dicyclopentadiene; an aliphatic diene having the structure

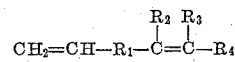

wherein R$_1$ is an alkylene radical, R$_2$ and R$_3$ are independently selected from the group consisting of hydrogen and alkyl radicals and R$_4$ is an alkyl radical and wherein R$_1$ to R$_4$ are so selected that the diene has from about 6 to 22 carbon atoms; a 5-alkenyl-substituted-2-norbornene; 5-methylene-2-norbornene, and 2-alkyl-2,5-norbornadienes.

Representative examples of copolymers of ethylene and at least one alpha monoolefin as defined above are
ethylene/propylene, which is preferred;
ethylene/1-butene;
ethylene/1-heptene;
ethylene/1-decene;
ethylene/propylene/1-butene;
ethylene/1-pentene/1-octene;
ethylene/5-methyl-1-hexene;
ethylene/4-methyl-1-pentene/5,6,6-trimethyl-1 - heptene; and
ethylene/1-butene/1-pentene/1-nonene.

Representative examples of aliphatic dienes, having the structure

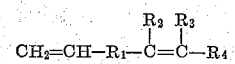

wherein the R's are as defined above, include 1,4-hexadiene, which is preferred;
1,9-octadecadiene;

6-methyl-1,5-heptadiene;
7-methyl-1,6-octadiene;
11-ethyl-1,11-tridecadiene;
9-ethyl-1,9-undecadiene;
7-ethyl-1,7-nonadiene;
8-propyl-1,8-undecadiene;
8-ethyl-1,8-decadiene;
10-ethyl-1,9-dodecadiene;
12-ethyl-1,12-tetradecadiene;
13-n-butyl-1,12-heptadecadiene; and
15-ethyl-1,15-heptadecadiene.

Dienes such as 11-ethyl-1,11-tridecadiene are made by reacting an alkyl Grignard reagent with the alkyl ester of an ω-unsaturated carboxylic acid and dehydrating the tertiary alcohol thereby produced.

Examples of copolymers of ethylene, an alpha monoolefin and at least one of these aliphatic dienes include ethylene/propylene/1,4-hexadiene, which is preferred;

ethylene/1-butene/1,4-hexadiene/11-ethyl-1,11-tridecadiene;
ethylene/1-butene/1-octene/6-methyl-1,5-heptadiene; and
ethylene/1-pentene/1,4-hexadiene/1,9-octadecadiene.

Another group of copolymers which may be prepared according to the present invention are those copolymers of ethylene, at least one alpha monoolefin as defined above and dicyclopentadiene. Representative examples include ethylene/propylene/dicyclopentadiene, which is preferred;

ethylene/1-butene/dicyclopentadiene;
ethylene/propylene/1-butene/dicyclopentadiene;
ethylene/1-octene/dicyclopentadiene;
ethylene/propylene/1-hexene/dicyclopentadiene;
ethylene/1-heptene/1-decene/dicyclopentadiene; and
ethylene/5-methyl-1-heptene/dicyclopentadiene.

Still another group of copolymers which may be prepared are those copolymers of ethylene, at least one alpha monoolefin as defined above and a 5-alkenyl-substituted-2-norbornene or 5-methylene-2-norbornene.

To obtain 5-methylene-2-norbornene, allene having the formula $H_2C=C=CH_2$ is heated in the absence of a polymerization initiator with cyclopentadiene. Preferably the reaction is carried out at a temperature of 175–225° C. and still more preferably above 200° C. and in the presence of an addition polymerization inhibitor. The broad temperature operating range is generally between about 150° and 250° C. The pressure under which this reaction is carried out is not critical. Good results are obtained when the reactants are heated in a closed container under the autogenous pressure developed by the reactants under the operating conditions. The reaction vessel can be constructed of any material which is insert to the reactants and is capable of withstanding the operating pressures. Reaction vessels made of glass, stainless steel and glass-lined steel are quite satisfactory. The reaction time can be varied widely. Times ranging from 2 to 24 hours or more at 150° C. to 250° C. are operable. Very good results are obtained in reaction periods ranging from 4 to 16 hours. Reactants which are commercially available in the grades used for polymerization are satisfactory for use in making 5-methylene-2-norbornene. However, best results are obtained when the allene is relatively pure.

Representative examples of copolymers of ethylene, at least one alpha monoolefin and 5-methylene-2-norbornene include ethylene/propylene/5-methylene-2-norbornene;
ethylene/1-butene/5-methylene-2-norbornene;
ethylene/1-decene/5-methylene-2-norbornene;
ethylene/5,5-dimethyl-1-octene/5-methylene-2-norbornene;
ethylene/4-methyl-1-hexene/5-methylene-2-norbornene;
ethylene/4,4-dimethyl-1-pentene/5-methylene-2-norbornene;
ethylene/5,6,6-trimethyl-1-heptene/5-methylene-2-norbornene.

The 5-alkenyl-2-norbornenes may be described by the following formula

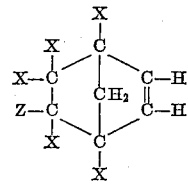

wherein each X represents hydrogen or a monovalent alkyl radical of from 1 to 6 carbon atoms; Z represents a monovalent alkenyl radical, the carbon-to-carbon double bond therein being internal.

A wide variety of 5-alkenyl-2-norbornenes can be made for use in the present invention by the Diels-Alder addition of both conjugated and non-conjugated hydrocarbon dienes to cyclopentadienes having the formula

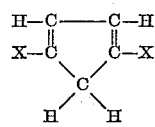

in which X is as heretofore described; the X's can be the same or different. The reaction is carried out at autogenous pressure in a closed inert (e.g. glass and stainless steel) container at temperatures ranging between about 150 and 250° C., preferably 175 to 225° C., for times ranging between about 2 to 24 hours. It is preferred that an addition polymerization inhibitor (e.g. hydroquinone) be present. Representative syntheses of this type are: the formation of 5-(2'-butenyl)-2-norbornene from cyclopentadiene and 1,4-hexadiene; the preparation of 5-(1'-propenyl)-2-norbornene from cyclopentadiene and 1,3-pentadiene (often called piperylene).

The reaction of cyclopentadiene with conjugated dienes having the structure X'—CH=CH—CH=CH—X", where X' and X" are alkyl radicals, can be used to prepare 4-alkyl-5-alkenyl-2-norbornenes having the structures

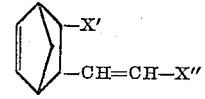

and

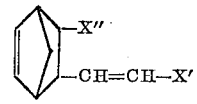

The reaction of cyclopentadiene with unsymmetrical nonconjugated dienes of the structure $$CH_2=CH—CH_2—CH=CH—Q$$

where Q is an alkyl radical will lead to 5-(2-alkenyl)-2-norbornenes

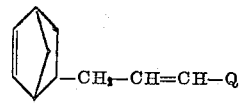

The reaction of cyclopentadiene with conjugated dienes of the formula $CH_2=CH—CH=CH—Q'$, where Q' is an alkyl radical, will produce

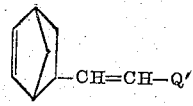

The 2-norbornenes having the structures

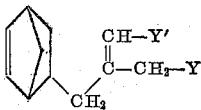

and

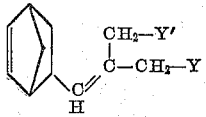

where Y is H or alkyl and Y' is alkyl, are made by reacting the Grignard reagent of 5-bromomethyl-2-norbornene in ether with ketones having the structure

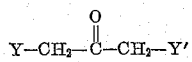

and dehydrating the resulting tertiary carbinol in refluxing toluene in the presence of anhydrous copper sulfate. The preparation of 5-(2'-ethyl-2'-butenyl)-2-norbornene from diethyl ketone is typical.

Representative examples of the heretofore described 2-norbornenes include:

5-(2'-ethyl-2'-butenyl)-2-norbornene;
5-(2'-ethyl-1'-butenyl)-2-norbornene;
5-(2'-methyl-1'-propenyl)-2-norbornene;
5-(2'-propyl-2'-pentenyl)-2-norbornene;
5-(2'-hexyl-2'-undecenyl)-2-norbornene;
5-(2'-nonyl-2'-heptenyl)-2-norbornene;
5-(2'-butyl-1'-pentenyl)-2-norbornene;
5-(2'-pentyl-1'-octenyl)-2-norbornene;
5-(2'-heptyl-1'-undecenyl)-2-norbornene;
5-(2'-methyl-2'-butenyl)-2-norbornene;
5-(2'-methyl-2'-decenyl)-2-norbornene;
5-(2'-methyl-1'-butenyl)-2-norbornene;
5-(2'-methyl-1'-hexenyl)-2-norbornene;
5-(2'-methyl-1'-undecenyl)-2-norbornene;
5-(2'-hexyl-2'-butenyl)-2-norbornene;
5-(2'-octyl-2'-butenyl)-2-norbornene;
5-(2'-ethyl-2'-decenyl)-2-norbornene; and
5-(2'-ethyl-1'-octenyl)-2-norbornene.

Representative examples of copolymers of ethylene, at least one alpha monoolefin and a 5-alkenyl-2-norbornene include ethylene/propylene/5-(2'-butenyl)-2-norbornene;
ethylene/propylene/5-(2'-ethyl-2'-butenyl)-2-norbornene;
ethylene/propylene/5-(2'-ethyl-1'-butenyl)-2-norbornene;
ethylene/propylene/5-(1'-propenyl)-2-norbornene;
ethylene/1-butene/5-(2'-heptyl-1'-undecenyl) - 2 - norbornene;
ethylene/1-butene/5-(2'-butenyl)-2-norbornene;
ethylene/1-butene/5-(2'-ethyl-2'-butenyl)-2-norbornene;
ethylene/4,4-dimethyl-1-hexene/5-(2' - propyl - 2' - pentenyl)-2-norbornene;
ethylene/5,5-dimethyl-1-octene/5 - (2' - nonyl - 2' - heptenyl)-2-norbornene;
ethylene/6-methyl-1-heptene/5-(2'-methyl-2'-decenyl)-2-norbornene;
ethylene/1-decene/5-(2'-hexyl-2'-butenyl)-2-norbornene; and
ethylene/5,6,6-trimethyl-1-heptene/5-(2'-octyl-2' - butenyl)-2-norbornene.

Still another group of copolymers which may be prepared are copolymers of ethylene, at least one alpha monoolefin as defined above and a 2-alkyl-substituted-2,5-norbornadiene. Representative examples include:

ethylene/propylene/2-methyl-2,5-norbornadiene;
ethylene/propylene/2-ethyl-2,5-norbornadiene;
ethylene/1-butene/2-methyl-2,5-norbornadiene;
ethylene/1-hexene/2-ethyl-2,5-norbornene;
ethylene/1-decene/2-butyl-2,5-norbornadiene; and
ethylene/1-heptene/2-octyl-2,5-norbornadiene.

The 2-alkyl-2,5-norbornadienes can be described by the following structural formula

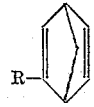

where R is a $C_1$–$C_8$ alkyl radical. These dienes are made by heating acetylenes having the formula R—C≡C—H, where R is a $C_1$–$C_8$ alkyl radical, with cyclopentadiene at 175 to 225° C. in the absence of a polymerization initiator. Closed reaction vessels made from stainless steel or glass-lined steel are satisfactory.

As noted above, the liquid reaction medium contains the coordination catalysts. The catalysts which are used in the process of this invention are generally prepared from compounds of metals of groups IVB, VB, and VIB and organo-metallic compounds of elements of groups IA, IIA, and IIIA. Aluminum alkyls or aluminum halogeno alkyls are suitable organometallics and vanadium halides, oxyhalides, or derivatives where organic radicals are bonded to the vanadium through an oxygen atom are suitable transition element compounds. Representative catalysts are made by contacting vanadium compounds, such as vanadium tris(acetylacetonate), vanadium oxybis(acetylacetonate), vanadium oxytris(isobutoxide) or vanadium oxytrichloride, with organoaluminum compounds, such as diisobutylaluminum chloride, isobutylaluminum dichloride, triisobutylaluminum, diisobutylaluminum bromide, isobutylaluminum dibromide, the reaction product of 0.5 mole to 2.0 moles of aluminum bromide and 1.0 mole of triisobutylaluminum, or the reaction product of 0.5 mole to 2.0 moles of aluminum chloride and 1.0 mole of triisobutylaluminum. The catalyst made by mixing titanium tetrachloride and triisobutylaluminum is also suitable. As is apparent to those skilled in the art, the selection of the preferred catalyst components will depend to a certain extent on the particular copolymer to be prepared. In making the ethylene/propylene copolymer or the ethylene/propylene/1,4-hexadiene copolymer the preferred catalyst is made by mixing vanadium tris(acetylacetonate) with the reaction product of 1.0 mole of triisobutylaluminum and 0.5 mole of aluminum chloride. Any of the catalyst systems described in U.S. Patent 2,962,451 can be used in the present process.

In preparing a preferred representative coordination catalyst either an alkyl aluminum compound or a vanadium compound is contacted with a mixture of the other in the liquid medium; alternatively, both compounds are introduced simultaneously into the liquid medium. The catalyst can be formed before, during, or after the introduction of nongaseous monomers. When making the above-described representative coordination catalysts, the proportions of the aluminum compound to the vanadium compound are selected so that there are at least 6 alkyl groups for every atom of vanadium. When aluminum triisobutyl is employed, the value of the molar ratio of Al:V is at least 2:1. Similarly, the value is at least 3:1 when diisobutylaluminum chloride is used. When the aluminum compound is made by reacting triisobutylaluminum with aluminum chloride, the triisobutylaluminum supplied should provide at least 6 isobutyl groups for every atom of vanadium. When the value of the isobutyl:vanadium ratio is below 6:1, the catalyst activity tends to be reduced. The preferred value ranges from about 15:1 to 21:1 (corresponding to an Al:V ratio of 5:1 to 7:1 when triisobutylaluminum is used). Higher values such as 30:1 are suitable.

Those skilled in the art can determine the concentrations of the organic-metallic compound and the IVB, VB, and VIB metal compound which give the most convenient process and the copolymer product best suited for a particular purpose. The IVB, VB and VIB metal compound concentration in the reaction mixture usually ranges from about 0.0001 to 0.1 molar, 0.005 to 0.05 molar often being preferred. When the concentration is less than 0.005 the rate of coherent film formation is generally too slow for practical purposes. It is possible to prepare concentrated mixtures of coordination catalyst which, when desired, can be diluted by addition of more of the liquid medium prior to being contacted with the polymerizable monomer or monomers.

After the liquid medium containing the coordination catalyst has been prepared, it can be stored in the absence of the air, water, carbon dioxide, Zerewitinoff active hydrogen compounds. In general, the catalyst stability decreases as the temperature is raised.

In preparing the coordination catalyst system from the compounds, such as from the preferred vanadium and aluminum reactants, one of the compounds may be contacted with the other in the liquid medium. Alternatively, both catalyst components may be introduced simultaneously into the liquid medium. Some of the monomers which are copolymerized with ethylene, such as some of the non-conjugated hydrocarbon dienes, are normally not gaseous at the preferred operating temperatures; these non-gaseous monomers may, therefore, be introduced into the liquid reaction medium. The coordination catalyst can be formed before, during, or after the introduction of the non-gaseous monomers. Accordingly, the quiescent liquid surface of the liquid reaction medium may contain not only the solvent, such as methylene chloride, and the coordination catalyst, but also one or more of the non-gaseous monomers to be copolymerized; in order to avoid solubilizing the copolymer to an undue degree, it is preferred that the total concentration of non-gaseous monomer in the liquid reaction medium not exceed about 2.0 molar.

When operating the present invention, a quiescent liquid surface of a liquid reaction medium is formed by introducing the components of the coordination catalyst, and optionally one or more of the non-gaseous monomers to be reacted, into an inert solvent in which the polymer products to be formed are insoluble and in which the coordination catalyst can be uniformly dispersed or dissolved; the quiescent liquid catalyst surface is then contacted with gaseous ethylene and, optionally, one or more of any of the gaseous monomers to be copolymerized therewith; a coherent normally solid insoluble film is formed at the quiescent liquid surface; and thereafter the solid polymeric product is mechanically removed either continuously or intermittently. The preferred temperature lies between about $-15°$ C. and about $15°$ C. At temperatures above $15°$ C. at atmospheric pressure the yield per unit volume of quiescent liquid surface tends to decrease. The yield will depend in part upon the nature of the solvent employed for the liquid medium. As has been stated above, the ability of a particular solvent to dissolve a particular polymer product will not necessarily be the same as that of another solvent. Those skilled in the art can determine the temperature at which the polymer is most insoluble and under which the catalyst is more active and the monomers most soluble.

Any material is suitable for the reaction vessel which is inert to the reactants. Glass, glass enamel, or stainless steel are satisfactory. Gas outlet tubes should be protected from inflow of outside air by suitable traps.

In carrying out the polymerization process, ethylene and, optionally, other copolymerizable gaseous monomers are introduced separately or in admixture at a rate equal to or in excess of the rate at which the polymer product is formed. The introduction of the monomer during the polymerization may continuous or periodic. It is preferred that gaseous monomer mixtures contain at least 5 mole percent ethylene.

In operating the polymerization process, care should be taken to exclude all traces of moisture and oxygen since they tend to poison the catalyst system.

A protective atmosphere of an inert gas such as argon or nitrogen is often supplied prior to the introduction of the gaseous monomer feed stream. Monomer gases can be purified by passing them successively through columns of silica gel, scrubbers containing triisobutyl aluminum, and a column of silica gel connected to the inlet tube of the reaction vessel. The dienes and normally liquid alpha-monoolefins can be purified by fractional distillation and passage through silica gel. The shape and size of the reaction vessel are not critical. However, it is desirable to have as large a surface area for the quiescent liquid surface as possible. In representative operations the quiescent liquid surface has a depth ranging from about 0.5 to 1 centimeter. In a typical operation the reactor consists of two chambers separated by a stainless steel plate; the quiescent liquid is placed above the plate; cooling or heating fluids are circulated below for temperature control.

The reaction time will depend upon the monomers being polymerized and the temperature and the particular catalysts employed. Those skilled in the art can readily determine the amount of time needed by empirical means wherein the film is visually observed and removed at ever-increasing time intervals. In general, times ranging from about 10 minutes to ½ hour are suitable. After the film has formed to a thickness of about 0.5 to 3 millimeters, it may be removed as a coherent film or it may be scraped off and rolled up by a doctor knife technique or other methods.

After the product has been separated from the quiescent liquid surface by the above-described mechanical means, a non-volatile antioxidant, such as 2,2'-methylene bis(6-tert-butyl-4-methyl phenol) or 4,4'-thiobis(2-tert-butyl-5-methyl phenol) is often incorporated to avoid possible oxidation and degradation of the polymer. After isolation, the polymer can be treated with acetone in a mixing device such as a Waring "Blendor." In any event, the polymer product can finally be obtained by drying, as for example, in a vacuum oven. Elastomeric products such as the ethylene/propylene copolymer or the ethylene/propylene/1,4-hexadiene copolymer can be mill dried according to the procedures familiar to those skilled in rubber technology.

The following examples will better illustrate the nature of the present invention; however, the invention is not intended to be limited to these examples. Parts are by weight unless otherwise indicated.

Example 1

(A) The reaction flask was a one-liter glass resin flask equipped with a stirrer, a thermometer, a gas inlet tube, a gas outlet tube, and a liquid inlet tube covered with a rubber (serum) cap. This apparatus was flame-dried and allowed to cool under a stream of purified nitrogen which was maintained during subsequent operations until monomer gases were introduced.

Methylene chloride (500 milliliters) at about $25°$ C. was filtered through a column of silica gel directly into the reaction flask and cooled to about $0°$ C. while being sparged with the purified nitrogen.

Then vanadium tris(acetylacetonate) (0.35 gram) and diisobutyl aluminum monochloride (5 milliliters of a one molar solution in methylene chloride obtained by dissolving triisobutyl aluminum and aluminum chloride in 2:1 molar proportions) were, in turn, added with stirring. After the catalyst solution had been aged for 5 minutes at $0°$ C., agitation and nitrogen inflow were stopped. A monomer gas mixture supplying ethylene and propylene at respective rates of 700 cc. per minute and 2000 cc. per minute was introduced into the reaction flask above the surface of the catalyst solution. The ethylene and propylene had been separately metered through flow meters connected to separate purification trains where they passed successively through a column of silica gel, three columns each containing a 20% solution of aluminum triisobutyl in "Nujol" oil (a liquid petrolatum of specific gravity 0.88/0.90 at 60° F.), a column of "Nujol" oil, and a final silica gel column leading to a T-tube joining the streams. The nitrogen had been purified by passage through a similar train.

Copolymer formed at the surface of the catalyst as a thin film approximately 0.1 to .2 millimeter thick. The first film was brushed away with the stirrer after 20 minutes. Fresh catalyst solution was then exposed to the monomer atmosphere. A second film formed. The reaction was finally stopped by shutting off the monomer feed stream and exposing the reaction mixture to air. The copolymer film was then removed from the reactor and air-dried.

(B) The procedure of part A above was repeated except that a stainless steel screen (8-mesh) was placed at the bottom of the reaction vessel before the reaction was started. The polymerization was stopped essentially at the time when the copolymer film was removed by lifting the screen. About 0.5 gram of copolymer was obtained in 10 minutes reaction time. An infra-red spectrum showed that this film was an ethylene/propylene copolymer.

The approximate production rate was estimated as follows: The area of the cross section was about 80 square centimeters. The depth of the catalyst solution where polymerization took place was about 2 millimeters. Therefore, the volume of the effective catalyst solution was about 16 cubic centimeters.

The production rate was then 0.5 gram per 16 cubic centimeters per 10 minutes (about 187 grams/liter/hour) when the catalyst solution was 0.002 molar in vanadium.

Example 2

The general procedure employed in Example 1 above was repeated except that the ethylene feed rate was increased to 2 liters per minute and the catalyst concentration was 5 times as great as that employed in Example 1, that is, the concentration of vanadium in the reactor was 0.01 molar and the concentration of diisobutyl aluminum chloride was 0.05 molar.

After 5 minutes reaction time 0.52 gram of copolymer had formed as a thin film on the catalyst solution surface. The production rate was, therefore, about twice that achieved in Example 1B.

Example 3

A reaction vessel was assembled by clamping two 3-neck resin flask tops vertically together, base to base, with a 3-millimeter stainless steel plate between them. Two polytetrafluoroethylene gaskets were placed on either side of the junction. The monomer gas was introduced through the upper center neck through an inverted glass funnel position above the plate within the vessel; gas could escape through an upper side neck. The liquid catalyst was introduced from a syringe through a serum cap located on the remaining upper neck. The lower center neck was closed off with a glass plug. The remaining lower necks served as inlet and outlet, respectively, for the coolant (ice and salt water at a temperature of about −5° C.).

The monomer gases and the nitrogen were purified by the procedure of Example 1.

After the upper reactor compartment had been flushed with nitrogen, the catalyst solution of Example 2 (50 milliliters) and 1,4-hexadiene (1 milliliter) were introduced. The nitrogen stream was shut off and a feed stream supplying ethylene and propylene at the rate of 2 liters per minute each was introduced above the surface of the catalyst solution. After 30 minutes at 0° C., the reaction was stopped by disassembling the apparatus. From the steel plate a thin film of rubbery copolymer was removed whose infra-red spectrum exhibited an absorption band at 10.3 microns indicating the presence of 1,4-hexadiene monomer units.

Example 4

The apparatus used was similar to that described in Example 3 above except that a stainless steel dish, 4 inches in diameter and about 2.8 millimeters deep, was used in place of the flat plate.

A catalyst solution was prepared under purified nitrogen in a dry reactor by adding 5 milliliters of 1 molar diisobutyl aluminum monochloride solution (obtained by adding triisobutyl aluminum and aluminum chloride in 2:1 molar proportions to methylene chloride) and 0.35 gram of vanadium tris(acetylacetonate) to 100 ml. of methylene chloride at 0° C.

The nitrogen, ethylene, and propylene streams were purified according to the procedure of Example 1 above.

(A) 10 milliliters of the catalyst solution were introduced on top of the stainless steel dish. Then for a period of 10 minutes a monomer feed stream supplying ethylene and propylene at respective rates of 0.7 and 2.1 liters per minute was introduced. A soft, somewhat sticky film of ethylene/propylene copolymer was removed after 10 minutes reaction time, rinsed with methylene chloride, and air-dried. The yield was 0.56 gram.

(B) The procedure of A above was repeated except that the reaction time was increased to 20 minutes. The copolymer was obtained as a non-sticky film weighing 0.70 gram.

(C) 1,4-hexadiene (0.7 ml.) was added to the catalyst solution described above (70 ml.) to give a solution 0.1 molar in 1,4-hexadiene. Ten milliliters of this solution were introduced into the reactor and cooled to 0° C. An ethylene/propylene feed stream was then introduced for 20 minutes at the rate described in part B above. The rubbery copolymer film obtained weighed 0.51 gram.

(D) The procedure of part C above was repeated except that the reaction time was shortened to 10 minutes. The copolymer yield was 0.46 gram.

(E) The procedure of part D above was repeated except that the monomer feed streams supplied ethylene at the rate of 1 liter per minute and propylene at the rate of 1.3 liters per minute. The yield of copolymer was 0.57 gram. The infra-red spectrum of the copolymer indicated incorporation of hexadiene monomer units.

(F) The procedure of part E was repeated except that the amount of catalyst employed was reduced to 5 milliliters. The yield of copolymer was 0.49 gram.

Example 5

The apparatus and general procedure described in Example 3 above were employed except as noted below.

A catalyst solution 0.001 molar in vanadium and 0.005 molar in diisobutyl aluminum chloride was prepared by adding vanadium tris(acetylacetonate) (0.18 gram) and 2.5 milliliters of a methylene chloride solution 1.0 molar in aluminum (prepared by adding aluminum triisobutyl and aluminum chloride in 2:1 molar proportions to methylene chloride) to 500 milliliters of methylene chloride at a temperature slightly below 0° C.

(A) After 10 milliliters of the above-described catalyst had been placed in the upper chamber of the reactor at 0° C., ethylene was fed above the quiescent liquid at the rate of 1 liter per minute for 5 minutes. The yield of polyethylene was 0.28 gram.

(B) The procedure of part A above was repeated except that the reaction time was increased to 10 minutes. A total of 0.35 gram of polyethylene was produced.

(C) After 10 milliliters of the above-described catalyst had been added to the upper chamber of the reactor, a monomer feed mixture supplying ethylene at 1 liter per minute and propylene at 2 liters per minute was introduced above the quiescent liquid for 30 minutes at 0° C. to give a yield of 0.45 gram of ethylene/propylene copolymer film.

(D) 1,4-hexadiene (4.5 milliliters) was added to 450 milliliters of the catalyst solution. Ten milliliters of this solution (0.1 molar in 1,4-hexadiene) were placed in the upper chamber of the reactor at 0° C. and thereafter for 20 minutes ethylene was introduced at 1 liter per minute and propylene at 2 liters per minute. A total of 0.1 gram of copolymer was isolated.

Example 6

(A) The apparatus and general procedure described in Example 1 above were employed except as noted below.

A catalyst solution 0.002 molar in vanadium and 0.010 molar in aluminum was prepared by adding vanadium tris(acetylacetonate) (0.36 gram) and 5 milliliters of a methylene chloride solution 1.0 molar in aluminum (prepared by adding aluminum triisobutyl and aluminum chloride in 2:1 molar proportions to methylene chloride) to 500 milliliters of methylene chloride at a temperature slightly below 0° C.

(B) 1,4-hexadiene (4.5 milliliters) was added to the agitated catalyst solution prepared in Part A above. Agitation and nitrogen inflow were stopped and a monomer gas mixture supplying ethylene and propylene at respective rates of 1 and 2 liters/minute was introduced into the reaction flask above the surface of the catalyst. After 20 minutes reaction time at 0° C., the reactor was opened to the air. The copolymer film which had formed on the catalyst surface weighed 0.34 gram; the infra-red spectrum of this film indicated the presence of 1,4-hexadiene monomer units.

As many widely different embodiments of this invention may be made without departing from the spirit and scope thereof, it is to be understood that this invention is not limited to the specific embodiments thereof except as defined in the appended claims.

What is claimed is:

1. In the process of forming a polymeric product selected from the group consisting of polyethylene and a copolymer of ethylene and at least one other copolymerizable monomer, in the presence of a coordination catalyst, the improvement comprising forming said polymeric product as a coherent film at a quiescent liquid surface of a liquid reaction medium containing said coordination catalyst by passing the gaseous monomer reactants over said liquid surface, said polymeric product being substantially insoluble in said liquid reaction medium.

2. In the process of forming a polymeric product in the presence of a coordination catalyst, said polymeric product being selected from the group consisting of polyethylene and copolymers of ethylene and at least one other copolymerizable monomer, said copolymerizable monomers being selected from the group consisting of alpha monoolefins having the structure R—CH=CH$_2$ wherein R is an alkyl radical of not more than 8 carbon atoms and a non-conjugated hydrocarbon diene, the improvement comprising forming said polymeric product as a coherent film at a quiescent liquid surface of a liquid reaction medium containing said coordination catalyst by passing the gaseous monomer reactants over said liquid surface, said polymeric product being substantially insoluble in said liquid reaction medium.

3. A process according to claim 2 wherein the non-conjugated hydrocarbon diene is an aliphatic diene having the structure

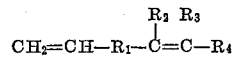

wherein $R_1$ is an alkylene radical, $R_2$ and $R_3$ are independently selected from the group consisting of hydrogen and alkyl radicals and $R_4$ is an alkyl radical and wherein $R_1$ to $R_4$ are so selected that the diene has from about 6 to 22 carbon atoms.

4. A process according to claim 1 wherein the polymeric product is formed at the quiescent liquid surface at a temperature of between about −15° C. and about 15° C.

5. A process according to claim 1 wherein the liquid reaction medium is selected from the group consisting of methylene chloride, ethyl chloride and 1,2-dichloroethane.

6. A process according to claim 1 wherein the coordination catalyst consists of vanadium tris(acetylacetonate) and diisobutyl aluminum monochloride.

7. A process for forming polyethylene in the form of a coherent film, which comprises passing gaseous ethylene over a quiescent liquid catalyst surface of a liquid reaction medium containing a coordination catalyst dispersed uniformly throughout said medium and mechanically removing said polyethylene in the form of a coherent film from said liquid surface, said polyethylene being substantially insoluble in said liquid reaction medium.

8. A process for forming an ethylene/propylene copolymer in the form of a coherent film, which comprises passing gaseous ethylene and propylene over a quiescent liquid catalyst surface of a liquid reaction medium containing a coordination catalyst dispersed uniformly throughout said medium and mechanically removing said ethylene/propylene copolymer in the form of a coherent film from said liquid surface, said copolymer being substantially insoluble in said liquid reaction medium.

9. A process for preparing an ethylene/propylene/1,4-hexadiene copolymer which comprises passing gaseous ethylene and propylene over a quiescent liquid surface of a liquid reaction medium containing a coordination catalyst dispersed uniformly throughout and also containing non-gaseous 1,4-hexadiene and mechanically removing said ethylene/propylene/1,4-hexadiene copolymer in the form of a coherent film from said liquid surface, said copolymer being substantially insoluble in said liquid reaction medium.

10. A process according to claim 7 wherein the liquid reaction medium is methylene chloride and the coordination catalyst consists of vanadium tris(acetylacetonate) and diisobutyl aluminum monochloride.

11. A process according to claim 8 wherein the liquid reaction medium is methylene chloride and the coordination catalyst consists of vanadium tris(acetylacetonate) and diisobutyl aluminum monochloride.

12. A process according to claim 9 wherein the liquid reaction medium is methylene chloride and the coordination catalyst consists of vanadium tris(acetylacetonate) and diisobutyl aluminum monochloride.

References Cited in the file of this patent

UNITED STATES PATENTS 3,065,220    McManimie et al. _____ Nov. 20, 1962

FOREIGN PATENTS 785,314    Great Britain _____ Oct. 23, 1957